Feb. 13, 1923.
J. O. AUTHIER
VALVE LOCK
Filed Dec. 27, 1920
1,444,899
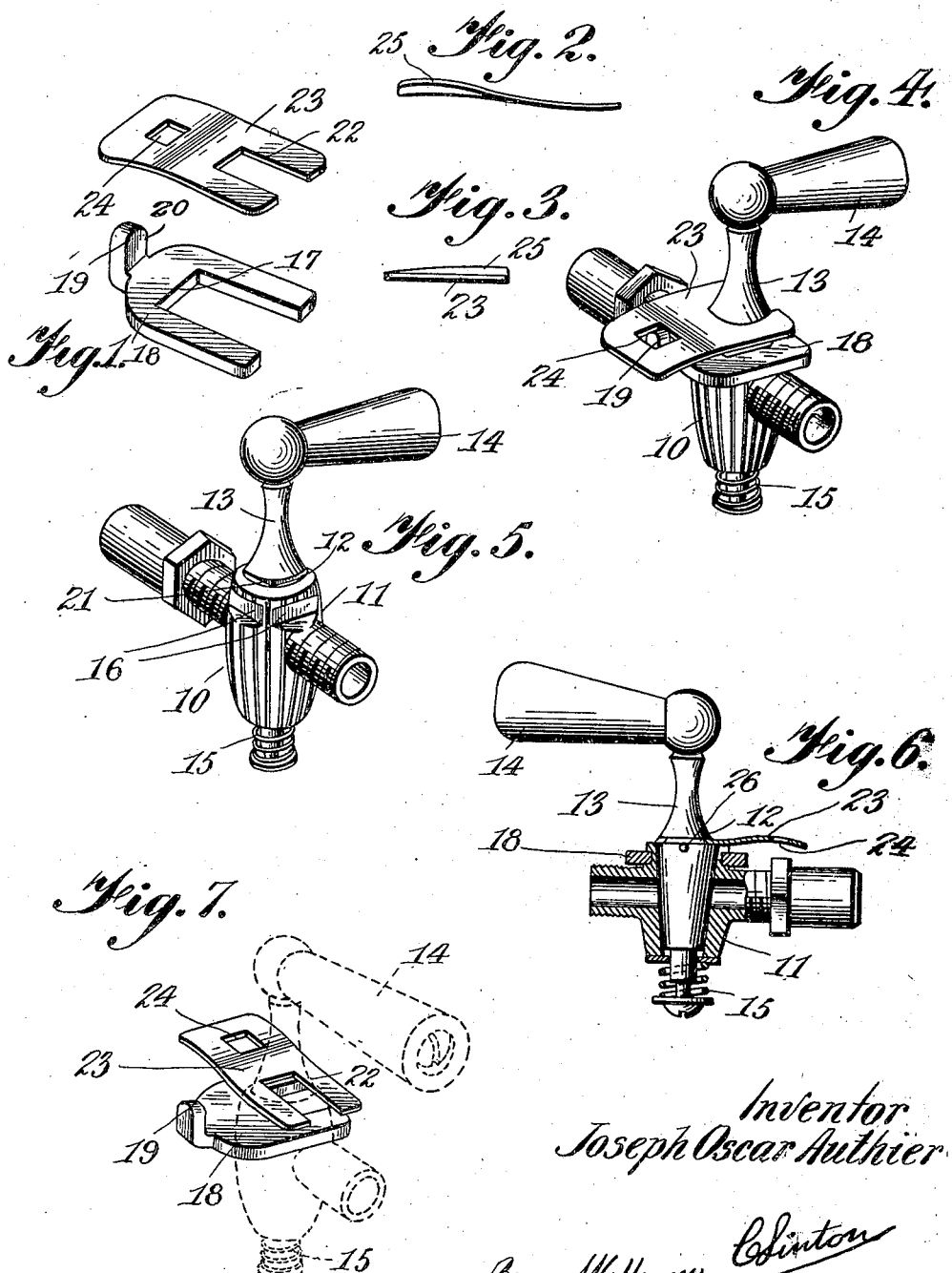
Inventor
Joseph Oscar Authier
By William Clinton
Attorney Patented Feb. 13, 1923.

1,444,899

UNITED STATES PATENT OFFICE.

JOSEPH OSCAR AUTHIER, OF MONTREAL, QUEBEC, CANADA, ASSIGNOR OF ONE-HALF TO HENRY BECHER HUNGERFORD, OF MONTREAL, QUEBEC, CANADA.

VALVE LOCK.

Application filed December 27, 1920. Serial No. 433,181.

*To all whom it may concern:*

Be it known that I, JOSEPH OSCAR AUTHIER, a subject of the King of Great Britain, residing at Montreal, Province of Quebec, Canada, have invented certain new and useful Improvements in Valve Locks; and I do hereby declare that the following is a full, clear, and exact description of the invention, such as will enable others skilled in the art to which it appertains to make and use the same.

The present invention relates to new and useful improvements in valve locks and more particularly to a class of such devices used particularly in locking the controlling valves of gas stoves and the like for preventing their accidental opening and consequent leakage of gas or the like into the rooms.

The primary object of the invention is the provision of an attachment such as above referred to which can be applied to any of the well known types now in common use.

Still another object of the invention is the provision of an attachment which is particularly adapted for rotary valves and which can be quickly and removably applied thereto and when in use engage and lock the said valve in closed position.

A still further object of the invention is the provision of a valve lock such as above referred to which likewise comprises a key for preventing any undesired movement of the said valve relative to its casing.

A further object of the invention is the provision of a device of the above specified type which includes a pair of sections one of which is rigid and provided with a locking lug, while the other of which is resilient and designed to engage the lug when the valve is in closed position, thus preventing any undesired opening or displacement of the valve.

Still another object of the invention is the provision of means whereby the said device will be easy of operation in order that the valve can be readily operated to open or closed position without interference from the attachment.

A still further object of the invention is the provision of a device such as above referred to, which will be comparatively simple and inexpensive to manufacture, reliable and efficient in use, and readily operated.

With the above and other objects in view, the present invention resides in the novel features of construction, formations, combinations and arrangements of parts to be hereinafter more fully described, claimed and illustrated in the accompanying drawings forming a part of the present application, and in which:—

Figure 1 is a perspective view of the sections of the improved lock removed;

Figure 2 is a side view of the resilient section;

Figure 3 is an end view thereof;

Figure 4 is a perspective view showing the same applied to a valve of usual construction;

Figure 5 is a similar view showing the same removed, and

Figure 6 is a longitudinal sectional view taken through the valve with the attachment applied thereto; and, Figure 7 is a detail perspective view showing the vave in dotted lines in open position and the attachment applied thereto in full lines.

Referring now to the accompanying drawings by corresponding characters of reference throughout the several views, the numeral 10 designates in general a valve of the usual construction designed particularly for use in controlling the flow of gas to gas stoves or the like.

This valve consists of the casing 11 in which is the rotatable valve plug 12 provided with a stem 13 and operating handle 14.

The lower end of the valve projects below the bottom of the casing and is held yieldingly in position by a spring 15.

The upper end of the casing 11 is provided with the transverse and longitudinal key slots 16 in which the forked end 17 of a plate 18 is removably inserted.

This plate extends transversely of the valve and is provided at its outer end with an upwardly extending finger 19 which is beveled as at 20 for a purpose to be later explained.

The base of the stem 13 is provided with corresponding key slots 21 in which is inserted the forked end 22 of a spring plate 23. The outer end of this plate 23 extends a greater distance than the plate 18 and is provided with an opening 24 through which the finger 19 is designed to pass, as shown in Figure 4, and when in this position, it will be readily seen that the valve 12 will be held against any undesired movement.

It will be seen from Figures 2 and 3 of the drawings that one edge of the plate 23 curves upwardly, as shown at 25, for engaging the beveled portion 20 of the finger 19. This arrangement obviously assists in guiding the finger 19 to its locking position within the opening 24 upon the rotation of the valve from open to closed position or from the position shown in Figure 4 to that shown in Figure 7.

The valve 12 is limited in its movement by the pin 26 which likewise assists in raising the spring plate 23 from its engagement with the finger 19 when the valve is moved to open position.

From the foregoing description, taken in connection with the accompanying drawings, it will be manifest that a valve lock is provided which will fulfil all of the necessary requirements of such a device, and it should be understood in this connection, that various minor changes in the specific details of construction can be resorted to within the scope of the appended claims, without departing from the spirit or sacrificing any of the advantages of the invention.

Having thus fully described the invention, what I claim as new and desire to protect by Letters Patent is:—

1. The combination with a valve such as described, including a casing and a rotatable plug, of plates secured to said casing and plug, one of said plates being resilient and having an opening, the other plate having a finger adapted for reception in said opening.

2. The combination with a valve such as described, including a casing and a rotatable plug, of a rigid plate secured to the casing, a resilient plate secured to the plug, said last mentioned plate having an opening therein, and a finger formed on the rigid plate for engaging said opening.

3. The combination with a valve such as described, including a casing and a rotatable plug valve, a pin limiting the movement between the valve and the casing, key slots formed in the valve and in the casing, plates removably positioned within said slots, and an interlocking engagement between said plates.

4. The combination with a valve such as described, including a casing and a rotatable plug, the adjacent ends of said casing and plug having key slots formed therein, a rigid plate having a forked end engaging the key slots in the casing, a resilient plate having a forked end engaging the key slots in the plug, said last mentioned plate having an opening therein, and a finger formed upon the rigid plate for engaging the opening in the resilient plate.

5. The combination with a valve or the like, including a casing and a rotatable plug, the adjacent ends of the casing and plug having key slots formed therein, a rigid plate having a forked end inserted in the key slots in the casing, a resilient plate having a forked end inserted in the key slots in the plug, said resilient plate having an opening therein and being inclined towards one edge thereof, a finger formed upon the rigid plate, and having a beveled end, and a pin limiting the movement between the plug and casing and for the purposes set forth.

In witness whereof I have hereunto set my hand.

JOSEPH OSCAR AUTHIER.